Jan. 10, 1967   F. W. HALL   3,297,046
MIXING AND DIVERTER VALVE
Filed Feb. 4, 1964   3 Sheets-Sheet 1

INVENTOR.
FRED W. HALL
BY Malcolm W. Fraser
ATTORNEY

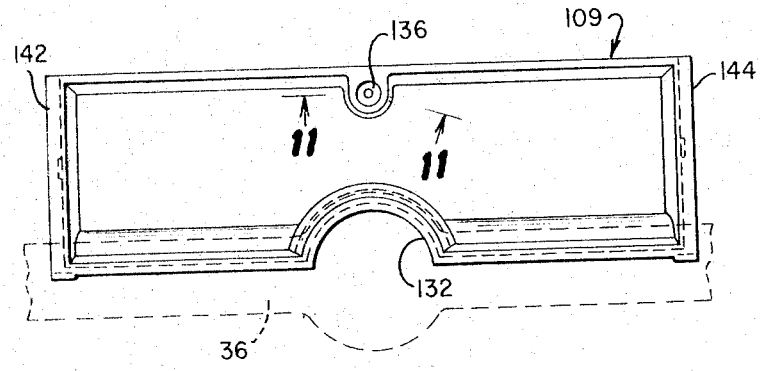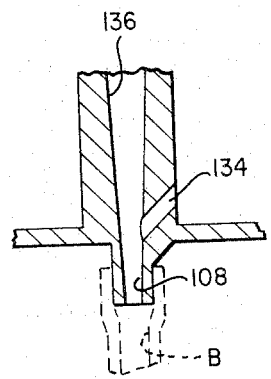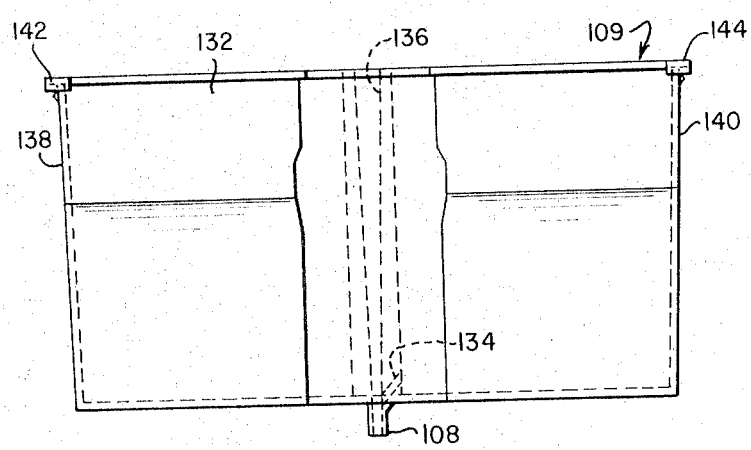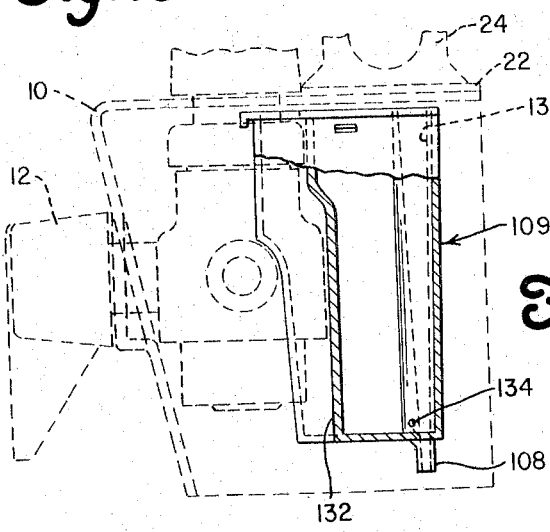

United States Patent Office 3,297,046
Patented Jan. 10, 1967

3,297,046
MIXING AND DIVERTER VALVE
Fred W. Hall, Toledo, Ohio, assignor to Gerity Products,
Inc., Toledo, Ohio, a corporation of Michigan
Filed Feb. 4, 1964, Ser. No. 342,385
4 Claims. (Cl. 137—119)

The present invention relates to a fountain brush type dishwashing apparatus and more particularly to a manually controlled valve capable of diverting water under pressure from flowing through an outlet spigot to another outlet through a fountain type brush where the water may be mixed with a liquid soap or detergent.

More specifically, the invention is concerned with a combination of a water spigot and a fountain type brush with a diverter control valve for selectively diverting water from the pressure source to the spigot or the fountain brush wherein the water from the spigot or the fountain brush is prevented from flowing in the reverse direction back into the main water source, in event the pressure of the source drops below the atmospheric pressure in either of the outlets. The assembly is adapted to be connected to the hot and cold water supply lines to replace the conventional sink plumbing fixtures.

Ordinarily the pressure in the water supply lines is determined by the pressure maintained in the city water main; and is generally at a pressure above the pressures at the fluid outlets of the apparatus. However, there are instances where the city water pressure is reduced substantially causing possible contamination problems.

Accordingly, in accordance with the structure of the invention the diverter control valve may be adjusted to cause the water to flow through a flexible hose or tube having a spray head and an associated scrubbing brush either in its clear state for rinsing purposes or mixed with a quantity of liquid soap or detergent. Assuming that the spray head is immersed in soapy water within the sink, and the pressure of the city water supply main drops to a value less than the atmospheric pressure at the spray head, then the dirty soapy water would be sucked back through the flexible tube, the control valve, and finally into the main water supply main with the result that the city water supply becomes contaminated.

It is an object of the invention to provide a dishwashing apparatus with new and improved means for preventing back flow of contaminated water through the spray head and flexible tube into the city water system in the event of a pressure drop in the city water supply main.

Another object is to provide the valving system in apparatus of the above character not only by simplifying the construction and arrangement of parts but insuring the effective operation despite the entry of foreign particles into the system which militate against normal valve seating.

A further object is to produce a dishwashing apparatus in which access to the valves is improved not only enabling an easier assembly of parts but affording ready inspection thereof for replacement or cleaning purposes.

Other objects and advantages of the invention will become more readily apparent from considering the following detail description of a preferred embodiment of the invention in connection with the attached drawings, in which:

FIGURE 9 is a top plan view of the liquid soap or detergent reservoir tank;

FIGURE 10 is a front elevational view of the reservoir tank illustrated in FIGURE 9;

FIGURE 11 is an enlarged sectional view of the discharge outlet of the tank reservoir taken along line 11—11 of FIGURE 9; and FIGURE 12 is a vertical sectional view of the tank reservoir illustrating the disposition of the tank relative to the associated diverter control valve means and wherein the valve means is shown by dotted lines.

Figure 1:
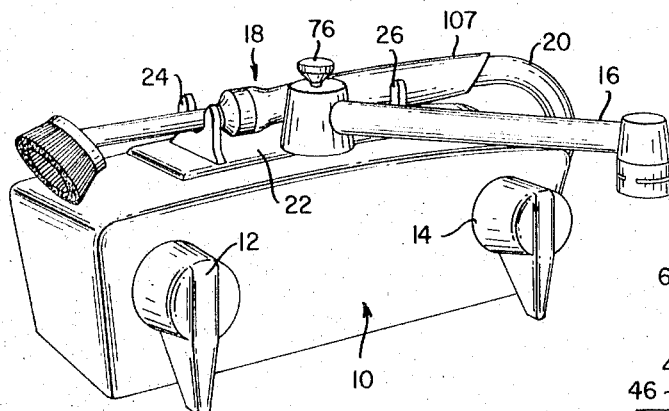
FIGURE 1 is a perspective view of a dishwashing apparatus embodying the features of the invention.

There is shown in the drawings a dishwashing apparatus which includes a housing 10; manually operated valve handles 12 and 14, one for controlling the flow of hot water and the other for controlling the flow of cold water; a swinging spout or discharge spigot 16; and a fountain-type spray brush assembly 18. The spray brush assembly 18 is connected to the water supply valve through one channel of a double channel flexible hose 20. As illustrated and specifically described with reference to FIGS. 9 to 12, the housing 10 contains a liquid soap or detergent reservoir and is provided with a cover 22 having spaced apart upstanding brackets 24 and 26 for holding the spray brush assembly 18 when not in use. The detergent reservoir communicates with the spray brush 18 through the other channel of the flexible hose 20.

Within the housing 10 there is disposed a diverter valve arrangement which is capable of directing the flow of water from the city water supply through the swinging spout 16 or alternatively through the spray brush assembly 18. In this regard and with particular attention to FIGURES 2 through 6, city water is introduced into the apparatus under pressure through a hot water inlet line 28 and a cold water inlet line 30, each of which is in direct communication with a manifold as will hereinafter appear. The hot water line 28 and the cold water line 30 are controlled by the valves actuated by handles 12 and 14, respectively.

The diverter valve arrangement is mounted within a suitable cavity 34 formed in the casting 36 which includes the hot and cold water lines 28 and 30. The valve structure includes a cylindrical plug-like member 38 which is typically machined from a brass material stock and is adapted snugly to engage the side wall of the cavity 34. The plug-like element 38 has a circumferential groove 40 which communicates with the hot and cold water inlet lines 28 and 30 and functions as an inlet manifold wherein the hot and cold water is mixed to some extent before passing to the diverter valve. On either side of the annular groove 40, there are external circumferential grooves 42 and 44 which receive resilient O-ring seal members 46 and 48 respectively. The O-rings 46 and 48 may be formed of any suitable sealing material, such as for example rubber, neoprene, nylon, Teflon or the like. The plug-like element 38 is secured within the cavity 34 of the casting 36 by means of a set screw 50 (FIG. 6) which extends through the wall of the casting 36 into a circumferential groove 52 formed in the element 38 below the groove 44.

An annular row of axially extending passages or inlet bores 54 are formed in the element 38 around a centrally disposed chamber 56. The passageways 54 establish communication between the inlet manifold or groove 40 and a diverter chamber defined by the innermost end of the cavity 34 which has an inwardly tapering annular wall portion 58 and the chamber 56.

A flat annular flap valve 60, formed of resilient material, such for example as rubber or neoprene, is disposed immediately above the plug element 38 and is adapted to close the upper ends of the passages 54. The outer peripheral edge portion of the flap valve 60 is held in place between the innermost end surface of the plug 38 and the adjacent wall of the cavity 34. Normally the flap valve 60 is in the position shown in FIGURE 2 of the drawings in which the passages 54 are closed.

The swinging spout 16 communicates with the passages 54 through vertically disposed cap-like member 62, which is rotatably secured within the upper end of the casting 36 by suitable sealing O-rings 64 and 66 and a cooperating collar 68 threadably engaged with the distal end of the upper end of the casting 36. The cap-like member 62 is provided with a central bore or socket 70, the upper end of which is in direct communication with the outlet spigot 16.

A diverter valve means is centrally disposed within the cap-like member 62 and includes a valve stem 72 carrying a diverter valve member 74 at the lower end thereof and an outside operating knob 76 at the upper end thereof. A helical spring 78 encircles the valve control stem 72 and has one end bearing against a stop 80 integral with the valve stem. The upper end of the spring bears against a packing 82 in the upper end of the socket 70. The helical spring 78 normally maintains the valve stem 72 and its associated diverter valve member 74 in the neutral position, shown in FIGURE 2. It will be noted that the stop 80 limits the upward travel of the valve stem 72 by engaging a shoulder 84 in the socket 70. Further, it will be noted that the diverter valve member 74 is floatingly or slidably mounted upon the valve stem 72, so that slight relative movement therebetween can take place.

Figure 3:
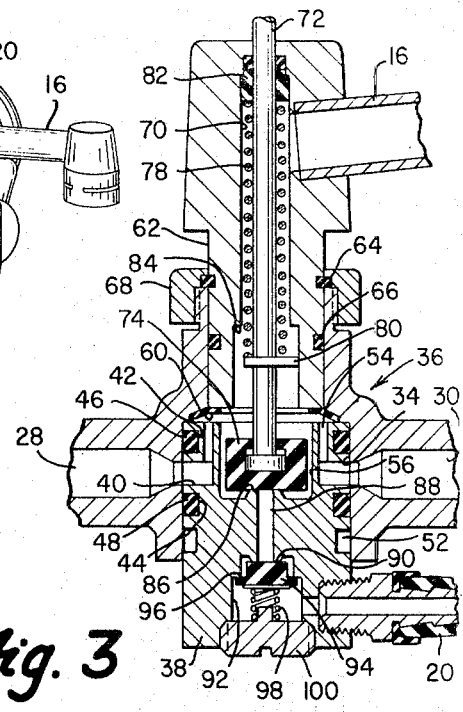
FIGURE 3 is a vertical sectional view similar to FIGURE 2 except showing the diverter control valve in a spout discharging position.
Figure 2:
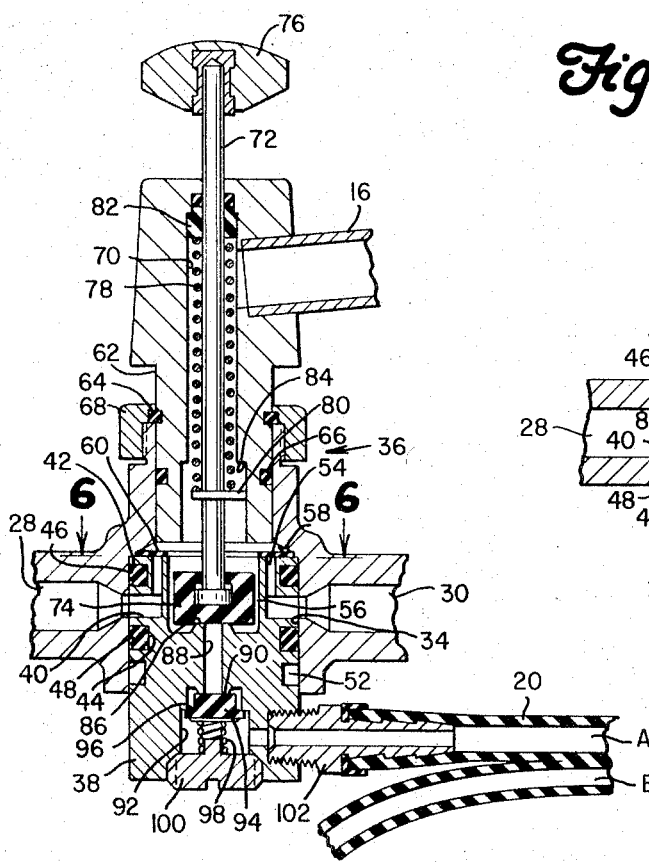
FIGURE 2 is an enlarged vertical sectional view of the apparatus illustrated in FIGURE 1 through the diverter control valve showing the parts thereof in a neutral position.

When the valve control stem 72 is in the position shown in FIGURE 2, and water under pressure is admitted through either or both of the lines 28 and 30, the water will flow upwardly through the annular row of passages 54 and force the resilient valve member 60 upwardly against the tapered wall portion 58, as illustrated in FIGURE 3. The water is then caused to flow upwardly through the socket 70 and out through the spigot member 16.

The bottom portion of the diverter valve member 74 normally seats against a valve seat 86 formed in the lower portion of the chamber 56 for the plug-like element 38. The valve seat 86 surrounds one end of a vertical passage or central bore 88 in the element 38, the other end of which is formed with a valve seat 90. The valve seat 90 is formed within the innermost end of a chamber 92 defined by a stepped wall portion. A check valve 94 is disposed within the chamber 92 and has a radially extending circumferential flange 96 and a helical spring 98. The check valve is held within the chamber 92 and supported by an externally threaded plug 100 against which a biasing spring bears. The spring 98 normally biases the valve member 94 to the position illustrated in FIGURES 2 and 3 wherein the innermost end thereof is seated on the valve seat 90 and the flange portion 96 is seated against the stepped wall portion of the chamber 92, thereby forming a double seated check valve arrangement. The chamber 92 is provided with an outlet nipple 102 which is adapted to be connected to one end of one of the channels of the flexible hose 20.

The annular flap valve 60, the diverter control valve member 74, and the check valve 94 may be formed of a molded rubber material or of other materials which are relatively resilient in nature and are not adversely affected by the hot or cold water with which they come in contact.

Figure 4:
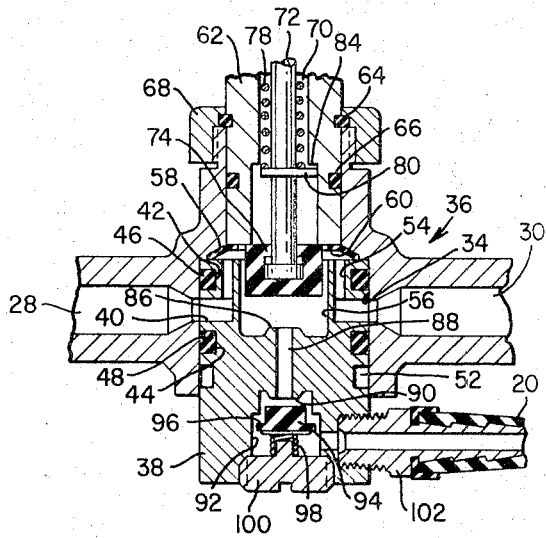
FIGURE 4 is a vertical sectional view similar to FIGURE 2 except showing the diverter control valve in a brush discharging position.
Figure 7:
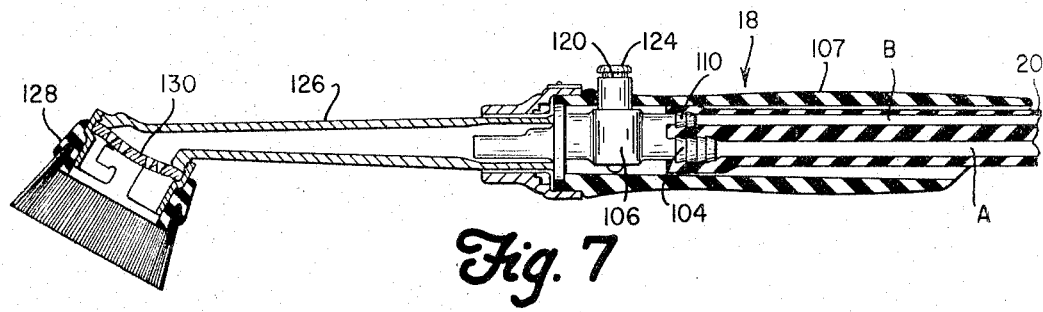
FIGURE 7 is a longitudinal fragmentary sectional view through the fountain brush and connected tube.
Figure 8:
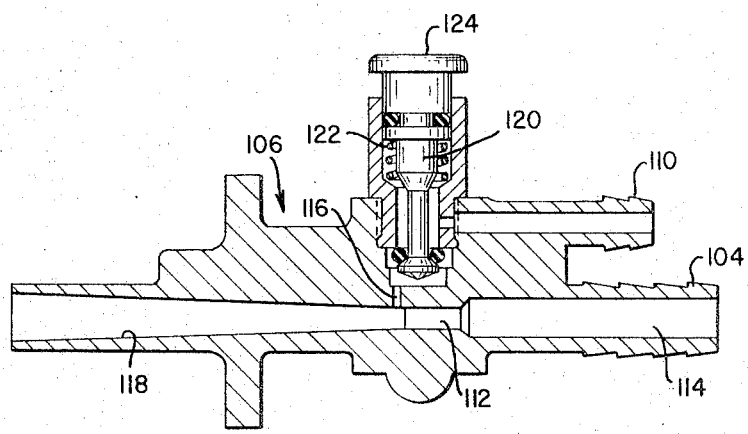
FIGURE 8 is an enlarged fragmentary sectional view of the liquid soap or detergent control valve for the fountain brush.
Figure 5:
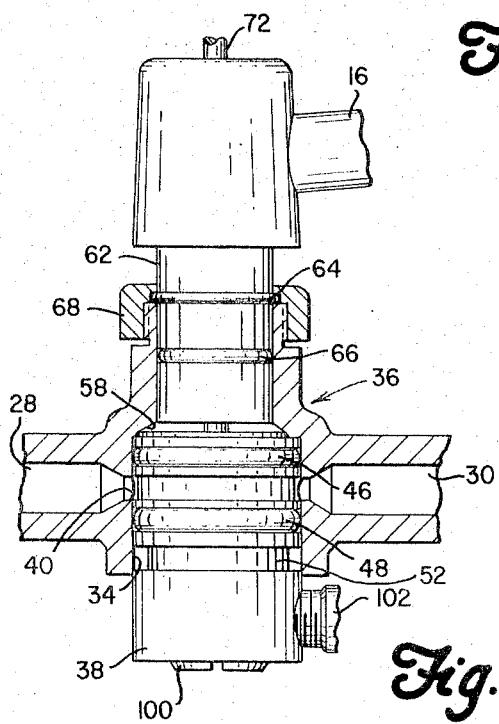
FIGURE 5 is an enlarged fragmentary view of the diverter control valve structure with portions of the outer housing broken away more clearly to illustrate the structural features thereof.
Figure 6:
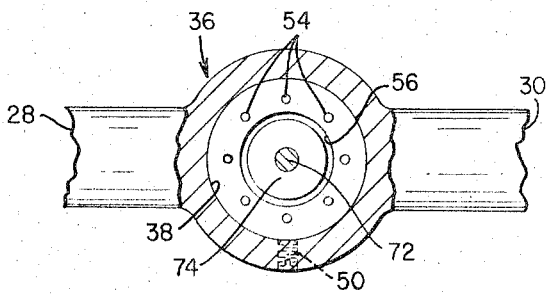
FIGURE 6 is an enlarged sectional view of the apparatus taken along line 6—6 of FIGURE 2.

When it is desired to divert the water from flowing through the swinging spout outlet 16 to the hose 20 and its associated spray head assembly 18, the knob 76 is raised against the tension of the helical spring 78 thereby to lift the diverter valve member 74 a sufficient amount to cause the upper surface thereof to seat against the lower end of the cap-like member 62 as illustrated in FIGURE 4. The water is thus prevented from flowing through the swinging spout 16 and is free then to flow through the chamber 56, the passage 88 and into the outlet fitting 102 through the chamber 92. The pressure of the water is sufficient to unseat the check valve 94 against the bias of the spring 98, thus allowing the water to flow through the outlet coupling 102, the hose 20 and discharge from the associated spray brush assembly 18. During this operation, the inward surge of the water through the passages 54 maintains the resilient valve member 60 against the inwardly inclined or tapering wall portion 58 of the casting 36. The water pressure maintains the diverter valve member 74 in its uppermost position and moves the check valve 94 downwardly from the valve seat 90 until the water pressure is cut off by closing the valves controlled by the handles 12 and 14. When the water pressure is reduced, the spring 78 returns the control valve 74 to its neutral position and allows the spring 98 to return the check valve 94 to its seat as shown in FIGURE 2. In the neutral position the annular resilient valve 60 overlies the outlet ends of the passages 54, and the valve members 74 and 94 are held seated against their respective valve seats. The valve member 74 is urged by the spring 78 to seat against the valve seat 86. The spring 98 urges the check valve 94 to seat against the valve seat 90 and simultaneously causes the flange portion 96 to seat against the shoulder formed by the stepped wall portion 92. Accordingly, it will be readily apparent that the check valve 94 is a double seating valve, the importance of which will hereinafter become manifest.

The flexible hose 20 consists of two separate channels designated on the drawings by the reference characters A and B. Channel A affords communication between the water supply from the outlet nipple 102 of the diverter valve assembly and a water inlet nipple 104 of a water-detergent mixing unit 106 integral with the spray brush assembly 18 and housed within a handle 107. Channel B provides communication between an outlet nipple 108 of a liquid detergent reservoir tank 109 (FIGURES 9 to 12) and a detergent inlet nipple 110 of the water-detergent mixing unit 106. The water inlet 104 communicates with a venturi throat 112 through a passage 114. The detergent inlet 110 terminates in a restricted passage 116 which is directed radially into an outlet passageway 118 on the downstream side of the venturi throat 112. A normally closed plunger actuated liquid detergent control valve 120 is interposed between the detergent inlet 110 and the restricted passageway 116. Normally, the valve 120 prevents the flow of detergent into the restricted opening 116 because the valve is held seated by a helical spring 122. By pressing the button-like plunger portion 124 of the valve 120 to unseat same, communication between the source of detergent supply and the passageway 116 is established.

The outlet or mixing passageway 118 is connected to one end of a brush handle 126 which has a hollow brush 128 connected to the other end. The brush 128 includes a perforated disc element 130 which separates the fluid passing through the handle 126 into a number of small streams directed into the zone defined by the bristles of the brush 128.

The liquid detergent tank 109 is typically made of a plastic material and has a front wall 132 which generally conforms to the outer configuration of the casting 36 to minimize the waste space within the outer housing 10 and provide for an adequately large reservoir for liquid detergent. The outlet nipple 108 communicates with the tank 109 through a passageway 134. An upwardly extending vent passage 136 provides communication between the outlet nipple 108 and the atmosphere to effect an even flow of liquid through the outlet nipple 108 and into the channel B of the hose 20. The vent passage 136 militates against the formation of a vacuum which would prevent the flow of the liquid.

The upper marginal edges of the opposed side walls 138 and 140 of the tank 109 are formed with supporting flanges 142 and 144 respectively which are adapted to fit on the marginal edges of an opening formed in the top wall of the housing 10. The opening is covered by the cover member 22 which carries the upstanding brackets 24 and 26.

Accordingly, when either or both of the water supply lines are opened by valves (not shown) controlled by the handles 12 and 14, the water will flow through the diverter valve apparatus and out through the swinging spout 16. In order to divert the water to flow through the outlet nipple 102 and thence to the spray brush, the diverter control valve 74 is lifted to the position illustrated in FIGURE 4, thereby causing the upper end of the control valve 74 to seat against the lower end of the cap-like member 62 and simultaneously unseating the lower end of the valve 74 from the valve seat 86. In this manner the water is prevented from flowing out through the swinging spigot 16 and is directed through the passage 88, unseating the check valve 94, through the chamber 92 and out through the outlet nipple 102. From the outlet nipple 102 the water flows through the channel A of the dual chamber hose 20 to the spray brush assembly 18.

When it is desired to mix a liquid cleaner with the water flowing through the brush assembly 18, the button 124 of the valve 120 is depressed against the bias of the spring 122 allowing the liquid cleaner to flow through the inlet nipple 110, the passage 116 and finally into the water stream flowing through the mixing passageway 118. The cleaner and the water are mixed together and then pass through the perforated disc 130 at a relatively increased pressure.

In the event of a pressure drop in the water from the supply main, creating a vacuum in the manifold 40 while the control valve elements are in the positions illustrated in FIGURES 3 or 4, the resilient annular flap valve 60 is automatically moved to a position blocking the passages 54 preventing any fluid from flowing back into the supply main. Another safeguard against the backflow is the control valve 74 which is normally spring urged against the valve seat 86. However, in the event the control rod 72 was somehow prevented from moving inwardly to seat the valve 74 against the valve seat 86, the check valve 94 is caused, both by a pressure drop and the action of the spring 98, to seat against its associated seat 90. If for some reason the check valve 94 did not seat against its valve seat 90, the outwardly extending flange 96 would seat against the shoulder formed in the stepped wall 92. In effect, there are four different and distinct safeguards all effective to prevent the backflow of dirty water through the flexible hose 20 in case of a drop in pressure in the supply lines.

It will be apparent to those skilled in the art that the safeguards as mentioned above are required by the building codes of various governmental agencies. Although it is not often that all of the above mentioned safeguards are necessary, several might frequently be required when foreign particulate material is present within the valve apparatus. In the event there were sand or mineral deposits, such as calcium, in the transient water, and a drop occurred in the pressure of the supply lines, it is possible that particulate material might become lodged in one and possibly two of the valves, which would prevent full closure thereof. However, it is highly unlikely that all of the valve elements of the apparatus discussed could become inoperative.

The check valve 94 is particularly effective in establishing a fluid tight seal even in the presence of particulate material such as sand. Should a grain of sand become lodged between the upper surface of the outwardly extending flange 96 and the adjacent surface of the stepped wall 92, the resilient nature of the flange is sufficient completely to encompass the particle and still obtain a liquid tight seal.

The apparatus illustrated in the drawings may be referred to as a "right hand" installation, that is the flexible hose 20 and the associated brush assembly 18 are arranged for use or manipulation by the right hand of the operator. However, the apparatus may be readily changed to a "left-hand" installation by merely loosening the set screw 50 and revolving the plug-like element 38 and its associated elements through 180°, and then tightening the set screw 50. In this manner, the flexible hose 20 extends from the left-hand side of the housing 10 and the brush assembly 18 can be supported on the spaced brackets 24 and 26 with the bristle portion thereof disposed on the right hand side of the housing.

From the above description, it will be understood that the plug-like element 38 can be readily removed from the casting 36 by loosening the screw 50 thereby affording ready access to the check valve 94, the diverter valve 74 and the flap valve 60 so that cleaning or replacement thereof can be effected without difficulty. Since these parts constitute the important valve parts of the apparatus it will be apparent that assembly is simplified. In the same casting 36 fits the cap-like member 62 to which the spout 16 is attached and this member with its valve stem 72 can be assembled in position of use or removed for inspection and repair in a relatively simple manner. It is significant that the various parts are sturdy in construction, easy to operate and function reliably despite the presence of foreign matter introduced by the water stream.

What I claim is:

1. In a dishwashing apparatus, an upright open ended housing having an intermediate lateral water inlet, a cap-like member in one open end of said housing provided with an axially disposed socket open at the inner end, a lateral spout at one end portion of said cap-like member communicating with said socket, a shiftable valve stem extending axially through said socket to the outside for manipulation, a valve body on the inner end of said stem adapted to seat against the inner end of said cap-like member for closing said socket and preventing the flow of water to said spout, a spring urging said stem to hold said valve body normally out of sealing engagement with said socket, a plug-like member insertable in the opposite open end of said housing having an annular row of L-shaped passages communicating with said water inlet enabling water to flow from the inlet to said socket and thence to said spout, said L-shaped passages extending radially inwardly and then longitudinally toward said cap-like member, an annular resilient flap valve interposed between the inner end of said plug-like member and the housing for closing said L-shaped passages to prevent back flow to said water inlet, a chamber in the inner end of said plug-like element within and in communication with said L-shaped passages and having an open inner end to receive said valve body, a check valve chamber in the outer end portion of said plug-like element having a spray outlet, an axial passage in said plug-like element connecting said first chamber and said check valve chamber for enabling water to flow to said spray outlet, said check valve chamber being in axial alignment with said axial passage in said plug-like element, a valve seat in said first chamber against which said valve body seats for closing said axial passage, and a spring tensioned check valve in said check valve chamber normally closing said last axial passage for preventing back flow and adapted to be unseated by pressure of water passing to said spray outlet.

2. In a dishwashing apparatus as claimed in claim 1, comprising liquid tight seals interposed between the plug-like member and the housing on opposite sides respectively of the water inlet, an external circumferential groove in said plug-like member, and a screw extending through said housing into the groove for retaining the plug-like member in place and upon being loosened enabling the plug-like member to be turned so that the outlet can be positioned for right or left hand disposition.

3. In a dishwashing apparatus as claimed in claim 1 in which the check valve comprises a rubber-like body having a seat adjacent an end of the axial passage for closing same, an integral laterally extending circumferential flange on said body, said flange and said seat being of sufficient resiliency to form around any foreign material becoming lodged therebetween, and a shoulder on the check valve chamber against which said flange seats substantially when the check valve body seats.

4. In a dishwashing apparatus as claimed in claim 3 in which the outlet from the check valve chamber is laterally disposed, a removable closure plug for said check valve chamber arranged at one side of said lateral outlet, and a spring on said plug for biasing the check valve.

References Cited by the Examiner
UNITED STATES PATENTS

| | | | |
|---|---|---|---|
| 2,018,288 | 10/1935 | Steirly. | |
| 2,255,774 | 9/1941 | Huffman | 251—296 XR |
| 2,710,020 | 6/1955 | Manville | 137—597 XR |
| 2,956,579 | 10/1960 | Moore | 137—218 |
| 3,164,167 | 1/1965 | Marugg | 137—516.25 |

ALAN COHAN, *Primary Examiner.*

HAROLD WEAKLEY, *Examiner.*